United States Patent
Baxter, Jr. et al.

(10) Patent No.: US 6,884,858 B2
(45) Date of Patent: Apr. 26, 2005

(54) PROCESS FOR PREPARING POLYOLEFIN PRODUCTS

(75) Inventors: C. Edward Baxter, Jr., League City, TX (US); Gilbert Valdez, Pearland, TX (US); Christopher Lobue, Montgomery, TX (US); Timothy Lowry, Spring, TX (US); Armen Abazajian, Houston, TX (US)

(73) Assignee: Texas Petrochemicals LP, Houston, TX (US)

(*) Notice: Subject to any disclaimer, the term of this patent is extended or adjusted under 35 U.S.C. 154(b) by 85 days.

(21) Appl. No.: 10/208,234

(22) Filed: Jul. 30, 2002

(65) Prior Publication Data

US 2003/0032740 A1 Feb. 13, 2003

Related U.S. Application Data (63) Continuation of application No. 09/665,084, filed on Sep. 20, 2000, now Pat. No. 6,525,149, which is a continuation-in-part of application No. 09/515,790, filed on Feb. 29, 2000, now Pat. No. 6,562,913.
(60) Provisional application No. 60/160,357, filed on Oct. 19, 1999.

(51) Int. Cl.$^7$ .................................................. C08F 4/52
(52) U.S. Cl. .................... 526/133; 526/88; 526/348.7; 526/348.6; 526/64; 526/237; 585/525
(58) Field of Search ........................ 526/64, 133, 348.7

(56) References Cited

U.S. PATENT DOCUMENTS

| | | |
|---|---|---|
| 132,264 A | 10/1872 | Eames et al. |
| 2,139,038 A | 12/1938 | Russell |
| 2,379,656 A | 7/1945 | Ruthruff |
| 2,407,494 A | 9/1946 | Hartvigsen |
| 2,411,097 A | 11/1946 | Kopp |
| 2,559,062 A | 7/1951 | Domte |
| 2,559,984 A | 7/1951 | Montgomery et al. |
| 2,727,022 A | 12/1955 | Linsk |
| 2,833,840 A | 5/1958 | Longwell |
| 2,856,395 A | 10/1958 | Richard, Jr. et al. |
| 2,889,370 A | 6/1959 | Schechter |
| 2,918,508 A | 12/1959 | Coopersmith et al. |
| 3,024,226 A | 3/1962 | Nolan, Jr. |
| 3,166,546 A | 1/1965 | Nolan, Jr. |
| 3,284,537 A | 11/1966 | Webb, Jr. |
| 3,346,354 A | 10/1967 | Kautsky et al. |
| 3,382,291 A | 5/1968 | Brennan |
| 3,634,383 A | 1/1972 | Miller, Jr. |
| 3,726,842 A | 4/1973 | Treischmann et al. |
| 3,778,487 A | 12/1973 | Driscoll et al. |
| 3,780,128 A | 12/1973 | Shubkin |
| 3,991,129 A | 11/1976 | Daniels |
| 4,110,521 A | 8/1978 | Barnett et al. |
| 4,152,499 A | 5/1979 | Boerzel et al. |
| 4,227,027 A | 10/1980 | Booth et al. |

(Continued)

FOREIGN PATENT DOCUMENTS

| | | |
|---|---|---|
| CA | 2195575 | 2/1996 |
| CA | 2217848 | 12/1996 |
| CA | 2334263 A1 | 12/1999 |
| DE | 27 02 604 | 7/1978 |
| DE | 1592016 | 7/1981 |
| EP | 0 145 235 A1 | 6/1985 |
| EP | 0 279 456 A1 | 8/1988 |
| EP | 0 322 241 A1 | 6/1989 |
| EP | 0 355 997 A1 | 2/1990 |
| EP | 0 400 905 A1 | 12/1990 |
| EP | 0 481 297 A2 | 4/1992 |
| EP | 0 628 575 A1 | 12/1994 |
| EP | 0 671 419 A1 | 9/1995 |
| EP | 0 628 022 B1 | 11/1998 |
| GB | 1159368 | 7/1969 |
| WO | WO 93/10063 | 5/1993 |
| WO | WO 94/14739 | 4/1994 |
| WO | WO 99/31151 A1 * | 6/1999 .......... C08F/110/10 |
| WO | WO 99/64482 A1 | 12/1999 |
| WO | WO 01/19873 | 3/2001 |
| WO | WO 01/27172 A1 | 4/2001 |
| WO | WO 02/06359 A1 | 1/2002 |
| WO | WO 02/14385 A1 | 2/2002 |

*Primary Examiner*—David W. Wu
*Assistant Examiner*—Rip A. Lee
(74) *Attorney, Agent, or Firm*—James H. Marsh, Jr.; Stinson Morrison Hecker LLP (57) ABSTRACT

A novel liquid phase polymerization process for preparing a polyolefin product having preselected properties is disclosed. The process includes the steps of providing a liquid feedstock which contains an olefinic component and a catalyst composition consisting of a stable complex of $BF_3$ and a complexing agent therefor. The feedstock may comprise any one or more of a number of olefins including branched olefins such as isobutylene, $C_3$ to $C_{15}$ linear alpha olefins and $C_4$ to $C_{15}$ reactive non-alpha olefins. The feedstock and the catalyst composition are introduced into a residual reaction mixture recirculating in a loop reactor reaction zone provided in the tube side of a shell and tube heat exchanger at a recirculation rate sufficient to cause intimate intermixing of the residual reaction mixture, the added feedstock and the added catalyst composition. The heat of the polymerization reaction is removed from the recirculating intimately intermixed reaction admixture at a rate calculated to provide a substantially constant reaction temperature therein while the same is recirculating in said reaction zone. The conditions in the reactor are appropriate for causing olefinic components introduced in said feedstock to undergo polymerization to form the desired polyolefin product in the presence of the catalyst composition. A product stream containing the desired polyolefin product is withdrawn from the reaction zone. The introduction of the feedstock into the reaction zone and the withdrawal of the product stream from the reaction zone are controlled such that the residence time of the olefinic components undergoing polymerization in the reaction zone is appropriate for production of the desired polyolefin product.

53 Claims, 2 Drawing Sheets

U.S. PATENT DOCUMENTS

| | | | |
|---|---|---|---|
| 4,238,628 A | 12/1980 | Cahill et al. | |
| 4,383,093 A | 5/1983 | Shiraki et al. | |
| 4,391,959 A | 7/1983 | Fauth et al. | |
| 4,400,493 A | 8/1983 | Abernathy, Jr. et al. | |
| 4,433,197 A | 2/1984 | Vogel et al. | |
| 4,605,808 A | 8/1986 | Samson | |
| 4,663,406 A | 5/1987 | Bronstert et al. | |
| 4,691,072 A | 9/1987 | Schick et al. | |
| 4,849,572 A | 7/1989 | Chen et al. | |
| 4,883,847 A | 11/1989 | Leung et al. | |
| 4,914,166 A | 4/1990 | Kennedy et al. | |
| 4,943,616 A | 7/1990 | Mishra et al. | |
| 4,956,512 A | 9/1990 | Nissfolk et al. | |
| 4,973,733 A | 11/1990 | Valkovich et al. | |
| 4,982,042 A | 1/1991 | Akatsu et al. | |
| 5,068,490 A | 11/1991 | Eaton | |
| 5,175,225 A | 12/1992 | Ruhe, Jr. | |
| 5,191,044 A | 3/1993 | Rath et al. | |
| 5,192,335 A | 3/1993 | Cherpeck | |
| 5,254,649 A | 10/1993 | Miln et al. | |
| 5,254,784 A | 10/1993 | Nurminen et al. | |
| 5,286,823 A | 2/1994 | Rath | |
| 5,300,701 A | 4/1994 | Cherpeck | |
| 5,408,018 A | 4/1995 | Rath | |
| 5,439,991 A | 8/1995 | Colman et al. | |
| 5,448,001 A | 9/1995 | Baird | |
| 5,563,313 A | 10/1996 | Chung et al. | |
| 5,710,225 A | 1/1998 | Johnson et al. | |
| 5,731,379 A | 3/1998 | Kennan et al. | |
| 5,767,334 A | 6/1998 | Nissfolk et al. | |
| 5,792,729 A | 8/1998 | Harrison et al. | |
| 5,811,616 A | 9/1998 | Holub et al. | |
| 5,910,550 A | 6/1999 | Rath | |
| 5,962,604 A | * 10/1999 | Rath | 526/65 |
| 5,977,251 A | * 11/1999 | Kao et al. | 525/53 |
| 6,642,329 B1 | 11/2003 | Rath | |
| 2003/0162918 A1 | 8/2003 | Wettling et al. | |
| 2003/0191257 A1 | 10/2003 | Wettling et al. | |

* cited by examiner

PROCESS FOR PREPARING POLYOLEFIN PRODUCTS

CROSS REFERENCE TO RELATED APPLICATIONS

This application is a continuation of utility application Ser. No. 09/655,084 filed on Sep. 20, 2000 (now U.S. Pat. No. 6,525,149), which in turn is a continuation-in-part of utility application Ser. No. 09/515,790 filed on Feb. 29, 2000 (now U.S. Pat. No. 6,562,913). Priority from each of said utility applications is claimed herein pursuant to 35 U.S.C. §120. In addition, priority benefits under 35 U.S.C. §119(e) are claimed in this application from provisional application Ser. No. 60/160,357, filed on Oct. 19, 1999. The entireties of the disclosures of said prior applications are hereby specifically incorporated herein by reference.

BACKGROUND OF THE INVENTION

1. Field of the Invention

The present invention relates to olefin polymerization and to the preparation of polyolefin products. In particular the present invention relates to the preparation of a variety of polyolefin products using a liquid phase polymerization process. In this latter regard, the invention relates to a novel liquid phase process for the polymerization of olefins using a modified $BF_3$ catalyst which is stabilized with a complexing agent.

2. The Prior Art Background

The polymerization of olefins using Friedel-Crafts type catalysts, including $BF_3$, is a generally known procedure. The degree of polymerization of the products obtained varies according to which of the various known polymerization techniques is used. In this latter regard, it is to be understood that the molecular weight of the polymeric product is directly related to the degree of polymerization and that the degree of polymerization may be manipulated by manipulating process parameters so as to produce a variety of products having respective desired average molecular weights.

Generally speaking, due to the nature and mechanics of the olefinic polymerization process, a polyolefin product has a single double bond remaining in each molecule at the end of the polymerization process. The position of this remaining double bond is often an important feature of the product. For example, polyisobutylene (PIB) molecules wherein the remaining double bond is in a terminal (vinylidene) position are known to be more reactive than PIB molecules wherein the remaining double bond is internal, that is, not in a terminal position. A PIB product wherein at least 50% of the double bonds are in a terminal position may often be referred to as high vinylidene or highly reactive PIB. The extent to which a polyolefin product has terminal double bonds may also be manipulated by manipulation of process parameters.

Current processes for olefin oligomerization often employ $BF_3$/co-catalyst systems wherein the $BF_3$ is complexed with a co-catalyst. This is done for a variety of reasons that are well known to those skilled in the olefin polymerization field. For example, and as is explained in U.S. Pat. No. 5,408,018, a complexed $BF_3$ catalyst may be useful for manipulating and attempting to balance the molecular weight, vinylidene content and polydispersity of PIB. The co-catalyst often is propanol or a higher alcohol and such co-catalyst systems are used irrespective of whether the desired product is a poly alpha olefin or a poly internal olefin. However, the use of alcohols having beta hydrogen atoms in such co-catalyst complexes is troublesome because, over time, the $BF_3$ tends to attack the beta hydrogen atoms. This leads to decomposition of the alcohol whereby the catalyst is rendered ineffective. Thus, the co-catalyst complex is unstable and often has a very short shelf life.

To address this problem, many current processes employ a procedure whereby the co-catalyst complex is prepared in-situ by mixing the alcohol and gaseous $BF_3$ immediately prior to introduction of the co-catalyst complex into a reactor. In addition, it is not unusual in the conduct of processes employing such co-catalyst systems to use an excess of alcohol and to sparge gaseous $BF_3$ into the reaction mass at several downstream points to rebuild catalyst activity. Such methodology implies a three-phase reaction and the necessity of using a stirred tank reactor to provide means of dispersing gaseous $BF_3$ into the reaction mass. These processes use either batch reactors or a set of continuously stirred tank reactors in series to provide both gas handling capability and to satisfy the necessity for a plug flow reactor configuration.

It is also known that alpha olefins, particularly PIB, may be manufactured in at least two different grades—regular and high vinylidene. Conventionally, these two product grades have been made by different processes, but both often and commonly use a diluted feedstock in which the isobutylene concentration may range from 40–60% by weight. More recently it has been noted that at least the high vinylidene PIB may be produced using a concentrated feedstock having an isobutylene content of 90% by weight or more. Non-reactive hydrocarbons, such as isobutane, n-butane and/or other lower alkanes commonly present in petroleum fractions, may also be included in the feedstock as diluents. The feedstock often may also contain small quantities of other unsaturated hydrocarbons such as 1-butene and 2-butene.

Regular grade PIB may range in molecular weight from 500 to 1,000,000 or higher, and is generally prepared in a batch process at low temperature, sometimes as low as −50 to −70° C. $AlCl_3$, $RAlCl_2$ or $R_2AlCl$ are used as catalysts. The catalyst is not totally removed from the final PIB product. Molecular weight may be controlled by temperature since the molecular weight of the product varies inversely with temperature. That is to say, higher temperatures give lower molecular weights. Reaction times are often in the order of hours. The desired polymeric product has a single double bond per molecule, and the double bonds are mostly internal. Generally speaking, at least about 90% of the double bonds are internal and less than 10% of the double bonds are in a terminal position. Even though the formation of terminal double bonds is believed to be kinetically favored, the long reaction times and the fact that the catalyst is not totally removed, both favor the rearrangement of the molecule so that the more thermodynamically favored internal double bond isomers are formed. Regular PIB may be used as a viscosity modifier, particularly in lube oils, as a thickener, and as a tackifier for plastic films and adhesives. PIB can also be functionalized to produce intermediates for the manufacture of detergents and dispersants for fuels and lube oils.

High vinylidene PIB, a relatively new product in the marketplace, is characterized by a large percentage of terminal double bonds, typically greater than 70% and preferentially greater than 80%. This provides a more reactive product, compared to regular PIB, and hence this product is also referred to as highly reactive PIB. The terms highly reactive (HR-PIB) and high vinylidene (HV-PIB) are synonymous. The basic processes for producing HV-PIB all include a reactor system, employing $BF_3$ and/or modified $BF_3$ catalysts, such that the reaction time can be closely controlled and the catalyst can be immediately neutralized once the desired product has been formed. Since formation of the terminal double bond is kinetically favored, short reactions times favor high vinylidene levels. The reaction is quenched, usually with an aqueous base solution, such as, for example, $NH_4OH$, before significant isomerization to internal double bonds can take place. Molecular weights are relatively low. HV-PIB having an average molecular weight of about 950–1050 is the most common product. Conversions, based on isobutylene, are kept at 75–85%, since attempting to drive the reaction to higher conversions reduces the vinylidene content through isomerization. Prior U.S. Pat. No. 4,152,499 dated May 1, 1979, U.S. Pat. No. 4,605,808 dated Aug. 12, 1986, U.S. Pat. No. 5,068,490 dated Nov. 26, 1991, U.S. Pat. No. 5,191,044 dated Mar. 2, 1993, U.S. Pat. No. 5,286,823 dated Jun. 22, 1992, U.S. Pat. No. 5,408,018 dated Apr. 18, 1995 and U.S. Pat. No. 5,962,604 dated Oct. 5, 1999 are all directed to related subject matter.

U.S. Pat. No. 4,152,499 describes a process for the preparation of PIBs from isobutylene under a blanket of gaseous $BF_3$ acting as a polymerization catalyst. The process results in the production of a PIB wherein 60 to 90% of the double bonds are in a terminal (vinylidene) position.

U.S. Pat. No. 4,605,808 discloses a process for preparing PIB wherein a catalyst consisting of a complex of $BF_3$ and an alcohol is employed. It is suggested that the use of such a catalyst complex enables more effective control of the reaction parameters. Reaction contact times of at least 8 minutes are required to obtain a PIB product wherein at least about 70% of the double bonds are in a terminal position.

U.S. Pat. No. 5,191,044 discloses a PIB production process requiring careful pretreatment of a $BF_3$/alcohol complex to insure that all free $BF_3$ is absent from the reactor. The complex must contain a surplus of the alcohol complexing agent in order to obtain a product wherein at least about 70% of the double bonds are in a terminal position. The only reaction time exemplified is 10 minutes, and the reaction is carried out at temperatures below 0° C.

In addition to close control of reaction time, the key to obtaining high vinylidene levels seems to be control of catalyst reactivity. This has been done in the past by complexing $BF_3$ with various oxygenates including sec-butanol and MTBE. One theory is that these complexes are actually less reactive than $BF_3$ itself, disproportionately slowing the isomerization reaction and thus allowing for greater differentiation between the vinylidene forming reaction (polymerization) and the isomerization reaction rates. Mechanisms have also been proposed that suggest the $BF_3$ complexes are non-protonated and thus are not capable of isomerizing the terminal double bond. This further suggests that water (which can preferentially protonate $BF_3$) must generally be excluded from these reaction systems. In fact, prior publications describing preparation of PIB using $BF_3$ complexes teach low water feed (less than 20 ppm) is critical to formation of the high vinylidene product.

HV-PIB is increasingly replacing regular grade PIB for the manufacture of intermediates, not only because of higher reactivity, but also because of developing requirements for "chloride free" materials in the final product applications. Important PIB derivatives are PIB amines, PIB alkylates and PIB maleic anhydride adducts.

PIB amines can be produced using a variety of procedures involving different PIB intermediates which provide a reactive site for subsequent amination. These intermediates may include, for example, epoxides, halides, maleic anhydride adducts, and carbonyl derivatives.

Reference to HV-PIB as "highly reactive" is relative to regular grade PIB. HV-PIB is still not, in absolute terms, highly reactive toward formation of some of these intermediates. Other classes of compounds, polyethers for example, can be much more reactive in the formation of amines and amine intermediates. Amines derived from polyethers are known as polyether amines (PEAs) and are competitive products to PIB amines.

The use of HV-PIB as an alkylating agent for phenolic compounds, is triggered by the higher reactivity and higher yields achievable with HV-PIB. These very long chain alkyl phenols are good hydrophobes for surfactants and similar products.

The largest volume PIB derivatives are the PIB-maleic anhydride reaction products. HV-PIB is reacted with maleic anhydride through the double bond giving a product with anhydride functionality. This functionality provides reactivity for the formation of amides and other carboxylate derivatives. These products are the basis for most of the lube oil detergents and dispersants manufactured today. As mentioned above, PIB-maleic anhydride products can also be used as intermediates in the manufacture of PIB amine fuel additives.

Other polyolefins which are commercially useful for a variety of purposes include conventional PIB wherein the vinylidene content is less than 50%, low molecular weight (<350 and perhaps even <250) oligomers of branched monomers such as isobutylene, oligomers and higher molecular weight polymers of linear $C_3$–$C_{15}$ alpha olefins, and oligomers and higher molecular weight polymers of linear $C_4$–$C_{15}$ non-alpha (internal double bond) olefins. Although these materials are all well known to those skilled in the olefin polymerization field, there is always a need for new developments which improve process efficiency and/or product qualities and reduce operating costs and/or capital expenditures.

SUMMARY OF THE INVENTION

The present invention provides a novel process for the efficient and economical production of polyolefin products. Generally speaking, the invention provides a liquid phase polymerization process for preparing a polyolefin product having preselected properties. In accordance with the principles and concepts of the invention, the process includes the steps of providing a liquid feedstock comprising at least one olefinic component and a catalyst composition comprising a stable complex of $BF_3$ and a complexing agent therefor. The feedstock and the catalyst composition are introduced into a residual reaction mixture in a loop reactor reaction zone where the residual reaction mixture is recirculated at a recirculation rate sufficient to cause intimate intermixing of the residual reaction mixture, the added feedstock and the added catalyst composition to thereby present a recirculating, intimately intermixed reaction admixture in said reaction zone. The recirculating intimately intermixed reaction admixture is maintained in its intimately intermixed condition while the heat of reaction is removed therefrom at a rate calculated to provide a substantially constant reaction temperature in the reaction admixture while the same is recirculating in said reaction zone. The constant reaction temperature is at a level appropriate for causing olefinic components introduced in said feedstock to undergo polymerization to form the desired polyolefin product in the presence of the catalyst composition. A product stream comprising the desired polyolefin product is withdrawn from the reaction zone. In accordance with the invention, the introduction of the feedstock into the reaction zone and the withdrawal of the product stream from the reaction zone are controlled such that the residence time of the olefinic components undergoing polymerization in the reaction zone is appropriate for production of the desired polyolefin product.

In accordance with one preferred form of the invention, the reaction zone may comprises the tube side of a shell-and-tube heat exchanger. The heat of the exothermic olefin polymerization reaction may be removed simultaneously with its generation by circulation of a coolant in the shell side of the exchanger. Preferably, the residence time of the olefinic components undergoing polymerization may be no greater than about 3 minutes. Even more preferably, such residence time may be no greater than about 2 minutes. More preferably still, such residence time may be no greater than about 1 minute. Ideally, the residence time may be less than 1 minute.

In accordance with another preferred form of the invention, the complexing agent should preferably be such the a stable catalyst complex is formed with $BF_3$. This is particularly advantageous at the relatively high reaction temperatures needed for oligomerization processes. In this regard, the complexing agent may advantageously comprise an alcohol, preferably a primary alcohol, and even more preferably a $C_1$–$C_8$ primary alcohol. In a highly preferred form of the invention, the alcohol should have no hydrogen atom on a β carbon. In this highly preferred form of the invention, the alcohol may be, for example, methanol or neopentanol.

In accordance with yet another preferred form of the invention, the complexing agent may comprise a glycol, preferably glycol wherein each hydroxyl group of the glycol is in a primary position, and even more preferably a $C_1$–$C_8$ glycol wherein each hydroxyl group of the glycol is in a primary position. In this highly preferred form of the invention, the glycol may be, for example, ethylene glycol.

In conformity with the concepts and principles of another aspect of the invention, the molar ratio of $BF_3$ to complexing agent in catalyst complex may range from approximately 0.5:1 to approximately 5:1. Preferably the molar ratio of $BF_3$ to complexing agent in said complex may range from approximately 0.5:1 to approximately 2:1. Even more preferably, the molar ratio of $BF_3$ to complexing agent in the complex may range from approximately 0.5:1 to approximately 1:1. Ideally, the molar ratio of $BF_3$ to complexing agent in complex may be approximately 1:1. Alternatively, the molar ratio of $BF_3$ to complexing agent in said complex may be approximately 0.75:1.

According to another aspect of the invention, the process may desirably be conducted such that from about 0.1 to about 10 millimoles of $BF_3$ are introduced into the reaction admixture with said catalyst composition for each mole of olefinic component introduced into said admixture in said feedstock. Preferably, from about 0.5 to about 2 millimoles of $BF_3$ may be introduced into the reaction admixture with the catalyst composition for each mole of olefinic component introduced into the admixture in said feedstock.

Another important preferred feature of the invention involves the continuous recirculation of the reaction admixture at a first volumetric flow rate, and the continuous introduction of the feedstock and the catalyst composition at a combined second volumetric flow rate. Desirably the ratio of the first volumetric flow rate to the second volumetric flow rate may range from about 20:1 to about 50:1. Preferably the ratio of the first volumetric flow rate to the second volumetric flow rate may range from about 25:1 to about 40:1. Ideally the ratio of the first volumetric flow rate to the second volumetric flow rate may range from about 28:1 to about 35:1. With regard to this latter aspect of the invention, the ratio of the first volumetric flow rate to the second volumetric flow rate may be such that the concentrations of ingredients in the reaction admixture remain essentially constant and such that essentially isothermal conditions are established and maintained in said reaction admixture.

In conformity with the principles and concepts of the invention, the feedstock and the catalyst composition may be premixed and introduced into the reaction zone together as a single stream at said second volumetric flow rate. Alternatively, the feedstock and the catalyst composition may be introduced into the reaction zone separately as two streams, the flow rates of which together add up to said second volumetric flow rate.

In further conformity with the principles and concepts of the invention, the reactor configuration, the properties of the reaction mixture, and the first volumetric flow rate may preferably be such that turbulent flow is maintained in said reaction zone. In this regard, in an ideal form of the invention, a Reynolds number of at least about 2000 is maintained in said reaction zone. In still further conformity with the principles and concepts of the invention, the reactor may take the form of the tube side of a shell-and-tube heat exchanger. In this regard, in an ideal form of the invention, a U of at least about 50 Btu/min ft$^{2\circ}$ F. is maintained in reaction zone.

Preferably, in accordance with the invention, the feed stock may comprise at least about 30% by weight of said olefinic component. Additionally, the feed stock may include non-reactive hydrocarbon diluents. In this latter regard, the feed stock may comprise at least about 30% by weight of said olefinic component with the remainder being non-reactive hydrocarbon diluents.

The polymerization process of the invention may be a cationic process. Alternatively the polymerization process of the invention may be a covalent process. An important feature of the invention is that the polyolefin product of the process of the invention may have a molecular weight of at least about 350 but no more than about 5000. Alternatively, the polyolefin product of the process of the invention may have a molecular weight no greater than about 350 and perhaps no greater than about 250.

In accordance with an important aspect of the invention, the olefinic component which is subjected to polymerization may comprise isobutylene and the polyolefin product may comprise PIB. In further accordance with this aspect of the invention, the PIB may have a vinylidene content of at least about 50%. Alternatively, the PIB may have a vinylidene content no greater than about 50%.

In accordance with yet another important aspect of the invention, the olefinic component may be a branched compound and the product may comprise a two, three or four member oligomer. The olefinic component used in the process of the invention may comprise isobutylene and the polyolefin product may comprise a $C_{12}$, $C_{16}$, $C_{20}$, or $C_{24}$ PIB oligomer. Alternatively, the olefinic component may comprise either a $C_3$ to $C_{15}$ linear alpha olefin or a $C_4$ to $C_{15}$ reactive non-alpha olefin such as 2-butene.

The present invention further provides a novel process for the efficient and economical production of HV-PIB. Generally speaking, the invention provides a HV-PIB production process wherein the polymerization reaction takes place at higher temperatures and at lower reaction times than were thought possible in the past. In particular, the present invention provides a liquid phase polymerization process for preparing low molecular weight, highly reactive polyisobutylene. Generally speaking, the process may involve cationic polymerization. However, under some conditions the polymerization reaction may be covalent. Particularly the latter may be true when ether is used as a complexing agent. In accordance with this embodiment of the invention, the process includes the provision of a feedstock comprising isobutylene and a catalyst composition comprising a complex of $BF_3$ and a complexing agent. The feedstock and the catalyst composition are introduced either separately or as a single mixed stream into a residual reaction mixture in a reaction zone. The residual reaction mixture, the feedstock and the catalyst composition are then intimately intermixed to present an intimately intermixed reaction admixture in said reaction zone. The reaction admixture is maintained in its intimately intermixed condition and kept at a temperature of at least about 0° C. while the same is in said reaction zone, whereby the isobutylene in the reaction admixture is caused to undergo polymerization to form a polyisobutylene product. A product stream comprising a low molecular weight, highly reactive polyisobutylene is then withdrawn from the reaction zone. The introduction of the feedstock into said reaction zone and the withdrawal of the product stream from the reaction zone are controlled such that the residence time of the isobutylene undergoing polymerization in the reaction zone is no greater than about 4 minutes. In accordance with the invention, it is possible to conduct the reaction so that the residence time is no greater than about 3 minutes, no greater than about 2 minutes, no greater than about 1 minute, and ideally, even less than 1 minute.

In accordance with the concepts and principles of the invention, the process may be conducted in a manner such that the polyisobutylene thus produced has a molecular weight in the range of from about 250 to about 5000, in the range of from about 600 to about 4000, in the range of from about 700 to about 3000, in the range of from about 800 to about 2000, and ideally in the range of from about 950 to about 1050. In accordance with the invention, it is possible to so control the process that a particular molecular weight, such as for example, a molecular weight of about 1000, may be achieved.

A major purpose of the invention is to provide a process which may be controlled sufficiently to insure the production of a polyisobutylene product having a vinylidene content of at least about 70%. More preferably the PIB product may have a vinylidene content of at least about 80%. Vinylidene contents of at least about 90% may also be achieved through the use of the invention.

The complexing agent used to complex with the $BF_3$ catalyst may desirably be an alcohol, and preferably may be a primary alcohol. More preferably the complexing agent may comprise a $C_1$–$C_8$ primary alcohol and ideally may be methanol.

To achieve the desired results of the invention, the molar ratio of $BF_3$ to complexing agent in the complex may range from approximately 0.5:1 to approximately 5:1. Preferably the molar ratio of $BF_3$ to complexing agent in the complex may range from approximately 0.5:1 to approximately 2:1. Even more preferably the molar ratio of $BF_3$ to complexing agent in the complex may range from approximately 0.5:1 to approximately 1:1, and ideally, the molar ratio of $BF_3$ to complexing agent in the complex may be approximately 1:1.

According to the principles and concepts of the invention, it is preferred that from about 0.1 to about 10 millimoles of $BF_3$ may be introduced into the reaction admixture with the catalyst composition for each mole of isobutylene introduced into the admixture in the feedstock. Even more preferably, from about 0.5 to about 2 millimoles of $BF_3$ may be introduced into the reaction admixture with said catalyst composition for each mole of isobutylene introduced into the admixture in the feedstock.

The invention provides a process whereby the polydispersity of said polyisobutylene may be no more than about 2.0, and desirably may be no more than about 1.65. Ideally, the polydispersity may be in the range of from about 1.3 to about 1.5.

In accordance with one preferred aspect of the invention, the reaction zone may comprise a loop reactor wherein the reaction admixture is continuously recirculated at a first volumetric flow rate, and said feedstock and said catalyst composition are continuously introduced at a combined second volumetric flow rate. The ratio of said first volumetric flow rate to said second volumetric flow rate may desirably range from about 20:1 to about 50:1, may preferably range from about 25:1 to about 40:1 and ideally may range from about 28:1 to about 35:1. In order to achieve the benefits of the invention, the ratio of said first volumetric flow rate to said second volumetric flow rate may preferably be such that the concentrations of ingredients in the reaction admixture remain essentially constant and/or such that essentially isothermal conditions are established and maintained in said reaction admixture.

The feedstock and the catalyst composition may be premixed and introduced into the reaction zone together as a single stream at said second volumetric flow rate. Alternatively, the feedstock and the catalyst composition may be introduced into the reaction zone separately as two respective streams, the flow rates of which together add up to said second volumetric flow rate.

To achieve the desired results of the invention, the reactor configuration, the properties of the reaction mixture, and the first volumetric flow rate may be such that turbulent flow is maintained in said reaction zone. In particular, the system may be such that a Reynolds number of at least about 2000 is achieved and maintained in said reaction zone. The system may also be such that a heat transfer coefficient (U) of at least about 50 Btu/min ft$^2$° F. is achieved and maintained in said reaction zone. To this end, the reactor may preferably be the tube side of a shell-and-tube heat exchanger.

In further accordance with the concepts and principles of the invention, the feed stock may generally comprise at least about 30% by weight of isobutylene, with the remainder being non-reactive hydrocarbon diluents.

In a more specific sense, the invention may provide a liquid phase polymerization process for preparing polyisobutylene having an average molecular weight in the range of from about 500 to about 5000 and a vinylidene content of at least 70%. The process may comprise providing both a feedstock comprising isobutylene and a separate catalyst composition made up of a complex of $BF_3$ and a $C_1$ to $C_8$ primary alcohol. The molar ratio of $BF_3$ to alcohol in said complex may desirably be in the range of from about 0.5:1 to about 2:1. The feedstock and the catalyst composition may be introduced separately or together as a single stream into a residual reaction mixture in a reaction zone, and the residual reaction mixture, the feedstock and the catalyst composition may be intimately intermixed to present an intimately intermixed reaction admixture in said reaction zone. The introduction of the catalyst complex into the reaction admixture may preferably be controlled so that about 0.1 to about 10 millimoles of $BF_3$ are introduced for each mole of isobutylene introduced with the feedstock. The intimately intermixed condition of the reaction admixture should preferably be maintained and the temperature thereof kept at about 0° C. or above while the admixture is in the reaction zone, whereby the isobutylene in the admixture undergoes polymerization to form said polyisobutylene. Thereafter, a product stream comprising the polyisobutylene product may be withdrawn from the reaction zone. The introduction of said feedstock into the reaction zone and the withdrawal of the product stream from the reaction zone may preferably be such that the residence time of the isobutylene undergoing polymerization in the reaction zone is no greater than about 4 minutes.

Even more desirably, the invention may provide a liquid phase polymerization process for preparing polyisobutylene having an average molecular weight in the range of from about 950 to about 1050, a polydispersity within the range of from about 1.3 to about 1.5, and a vinylidene content of at least about 80%. In accordance with this preferred aspect of the invention, the process comprises providing both a feedstock made up of at least about 40% by weight isobutylene and a separate catalyst composition made up of a complex of $BF_3$ and methanol, wherein the molar ratio of $BF_3$ to methanol in the complex ranges from about 0.5:1 to about 1:1. The feedstock and the catalyst composition are introduced either separately or together into a residual reaction mixture in a reaction zone. The residual reaction mixture, the feedstock and the catalyst composition are intimately intermixed by turbulent flow within said reaction zone, whereby an intimately intermixed reaction admixture is present in the reaction zone. Preferably, the catalyst complex is introduced into the reaction admixture at a rate such that about 0.5 to about 2 millimoles of $BF_3$ are introduced for each mole of isobutylene introduced in the feedstock. The intimately intermixed condition of the reaction admixture is maintained and the temperature thereof is kept at about 0° C. or more while the same is in said reaction zone, whereby the isobutylene therein is caused to undergo polymerization to form said polyisobutylene. A product stream comprising said polyisobutylene is withdrawn from said reaction zone. In accordance with the invention, the introduction of feedstock into the reaction zone and the withdrawal of product stream therefrom are controlled such that the residence time of the isobutylene undergoing polymerization in the reaction zone is within the range of from about 45 to about 90 seconds.

DETAILED DESCRIPTION OF THE PREFERRED EMBODIMENTS

In accordance with one very important embodiment of the present invention, an improved liquid phase process is provided for the efficient and economical production of PIB. In accordance with this embodiment of the invention, an isobutylene containing feedstock stream is contacted in a reaction zone with a catalyst which facilitates the polymerization reaction. Appropriate reaction conditions are provided in the reaction zone. After an appropriate residence time, a PIB containing product stream is withdrawn from the reaction zone. As mentioned above, many techniques for conducting the reaction are known; however, from a commercial viewpoint it is always desirable to improve the efficiency and economics of the process. With the foregoing in mind, the present invention provides an improved PIB producing process which may be easily controlled and manipulated to efficiently and economically provide a relatively low molecular weight, highly reactive PIB product.

The improved process of the present invention features the use of a $BF_3$ catalyst which desirably may be complexed with a complexing agent which appropriately alters the performance of the catalyst. Many other potentially useful catalysts are known to those of ordinary skill in the related art field. In particular, many useful catalysts are described in the prior patents referenced above. The complexing agent for the catalyst, and in particular for the $BF_3$ catalyst, may be any compound containing a lone pair of electrons, such as, for example, an alcohol, an ester or an amine. For purposes of the present invention, however, the complexing agent preferably may be an alcohol, desirably a primary alcohol, preferably a $C_1$–$C_8$ primary alcohol and ideally methanol.

The molar ratio of $BF_3$ to complexing agent in the catalyst composition may generally be within the range of from approximately 0.5:1 to approximately 5:1, desirably within the range of from approximately 0.5:1 to approximately 2:1, and preferably within the range of from approximately 0.5:1 to approximately 1:1. Ideally, the catalyst composition may simply be a 1:1 complex of $BF_3$ and methanol. In some preferred embodiments of the invention, the molar ratio of $BF_3$ to complexing agent in said complex may be approximately 0.75:1.

The temperature in the reaction zone may generally and preferably be greater than 0° C., the reactor residence time may generally and preferably be less than 4 minutes and the desired vinylidene (terminal unsaturation) content in the PIB product may preferably and generally be greater than about 70%. With these parameters, it is possible to operate the process so as to achieve efficiencies and economies not previously thought to be available. In accordance with the present invention, the catalyst concentration and the $BF_3$/complexing ratio may be manipulated as required to achieve the desired 70% vinylidene content with a reaction temperature greater than 0° C. and a reactor residence time of less than 4 minutes. Generally speaking, for PIB production the amount of the $BF_3$ catalyst introduced into the reaction zone should be within the range of from about 0.1 to about 10 millimoles for each mole of isobutylene introduced into the reaction zone. Preferably, the $BF_3$ catalyst may be introduced at a rate of about 0.5 to about 2 millimoles per mole of isobutylene introduced in the feedstock.

The process itself includes steps resulting in the intimate mixing of the isobutylene containing reactant stream and the catalyst complex and/or removal of heat during the reaction. The intimate mixing may desirably be accomplished by turbulent flow. Turbulent flow also enhances heat removal. These conditions separately or together permit the higher operating temperatures (e.g. >0° C.) and the shorter reactor residence times (e.g. <4 minutes) provided by the invention. These important parameters may be achieved by causing the catalyzed reaction to take place in the tubes of a shell-and-tube heat exchanger at a flow rate which results in turbulent flow.

Figure 1:
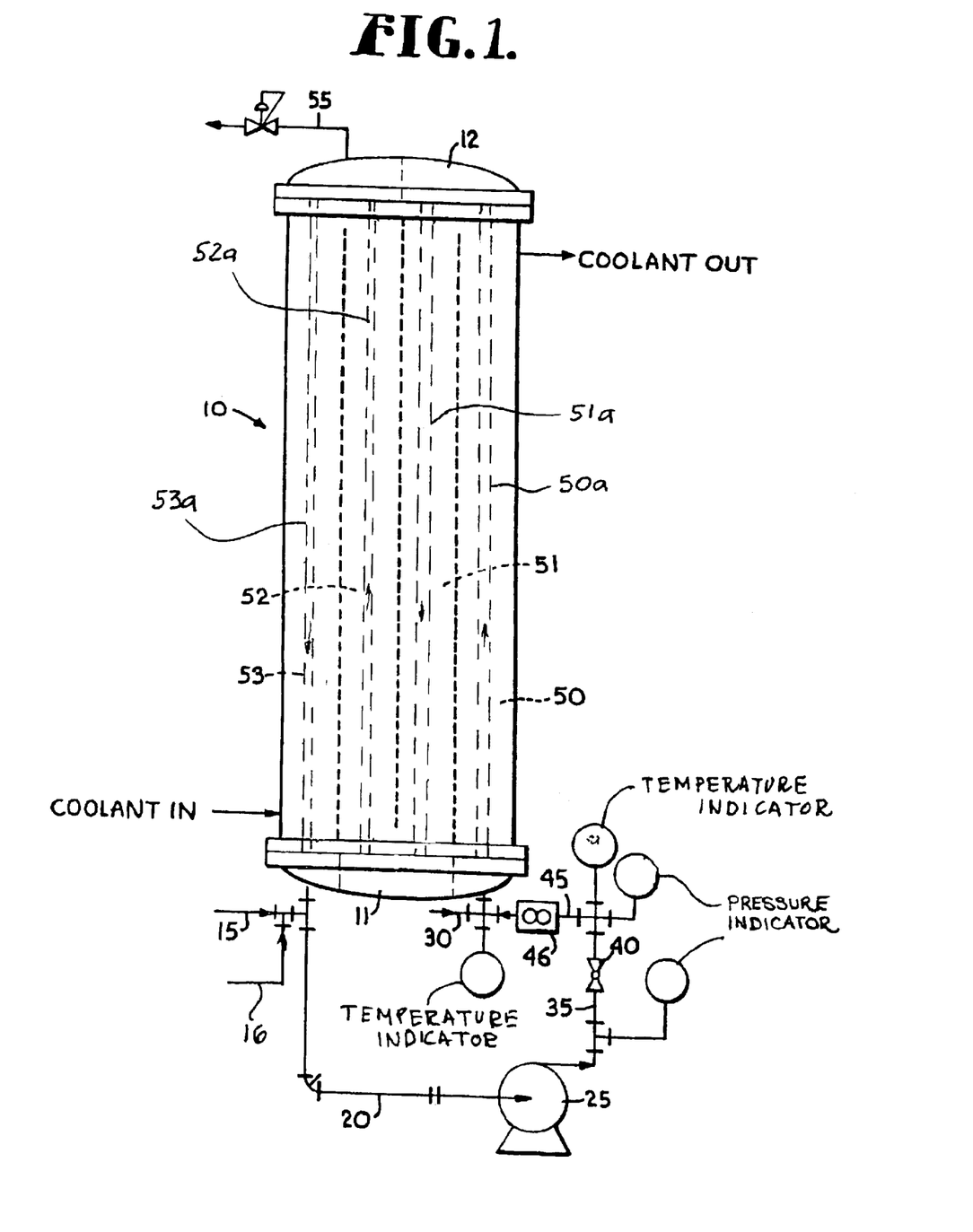
FIG. 1 is a schematic illustration of a reactor in the form of a multi-pass shell and tube heat exchanger which is useful for carrying out the improved process of the invention.

Many potentially valuable reactors are well known to the routineers in the art to which the invention pertains. However, for purposes of one preferred embodiment of the invention, the reactor may be a four-pass shell-and-tube heat exchanger as shown in FIG. 1 where it is identified by the numeral 10. The reactor may, for example, have 80 ⅜-inch tubes with a wall thickness of 0.022 inch, each thereby providing an internal tube diameter of 0.331 inch. The reactor may be three feet long and may have internal baffling and partitions to provide 4 passes with 20 tubes per pass. Such construction is well known in the heat exchanger and reactor arts and no further explanation is believed necessary.

In operation, in accordance with the preferred procedure for producing highly reactive PIB, the isobutylene containing feedstock enters the reactor system through pipe 15 which is preferably located adjacent the bottom head 11 of reactor 10. Pipe 15 directs the feed stock into the suction line 20 of a recirculation pump 25. The catalyst complex may be injected into the reactor circulation system through pipe 30 located adjacent bottom head 11 of reactor 10. It should be noted here, that in accordance with the principles and concepts of the invention, the catalyst complex could just as well be injected separately into the reactor, in which case a separate catalyst pump might be required.

A catalyst modifier may be added to the feedstock via pipe 16 before the feedstock enters the reactor system. The purpose of the modifier is to assist in controlling the vinylidene content of the PIB product. The catalyst modifier may be any compound containing a lone pair of electrons such as an alcohol, an ester or an amine. However, it is pointed out in this regard that if the amount of modifier is too great, the same may actually kill the catalyst. The feedstock containing the modifier enters the reactor system at the suction line 20 of the circulation pump 25. The catalyst complex composition enters the reactor system via line 30 at a location downstream from pump 25 and adjacent the first pass as shown in FIG. 1. The catalyst complex is preferably a methanol/$BF_3$ complex with a 1:1 molar ratio of $BF_3$ to methanol. The amount of modifier added via line 16 may vary from 0 to about 1 mole for each mole of $BF_2$ added as a complex via line 30.

Circulation pump 25 pushes the reaction mixture through line 35, control valve 40 and line 45 into the bottom head 11 of the reactor 10. A flow meter 46 may be positioned in line 45 as shown. The reaction mixture travels upwardly through pass 50, downwardly through pass 51, upwardly through pass 52 and downwardly through pass 53. As explained previously, each pass 50, 51, 52 and 53 may preferably include 20 separate tubes. For clarity, only a respective single tube is illustrated schematically in each pass in FIG. 1. These tubes are identified by the reference numerals 50a, 51a, 52a and 53a. However, as discussed above, each pass may preferably consist of a plurality, for example, 20 of these individual tubes.

It is to be noted here, that the reaction mixture should preferably be circulated through the tubes 50a, 51a, 52a, 53a of the reactor at a flow rate sufficient to obtain turbulent flow, whereby to achieve intimate intermixing between the catalyst complex and the reactants and a heat transfer coefficient appropriate to provide proper cooling. In this regard, the flow rate, the reaction mixture properties, the reaction conditions and the reactor configuration should be appropriate to produce a Reynolds number (Re) in the range of from about 2000 to about 3000 and a heat transfer coefficient (U) in the range of from about 50 to about 150 Btu/min ft$^{2\circ}$ F. in the tubes of the reactor. Such parameters may generally be obtained when the linear flow rate of a typical reaction mixture through a tube having an internal diameter of 0.331 inch is within the range of from about 6 to 9 feet per second.

The circulating reaction mixture leaves reactor 10 via suction line 20. The recirculation rate in the system is preferably sufficiently high so that the reactor, in essence, is a Continuous Stirred Tank Reactor (CSTR). In this same connection, and generally speaking, the recirculation rate of the reaction mixture should preferably be such that essentially steady state conditions are maintained in the reactor. It is pointed out in this latter regard that regardless of the system being in an unsteady or steady state, the design equations may be reduced to those of a CSTR when the recycle rate is sufficiently high. The reactor may also be of the type which is sometimes referred to as a loop reactor. With this system, which is only a preferred system since there are many other arrangements which would be apparent to those of ordinary skill in the art, the flow rate of the reactant mixture in the reactor may be adjusted and optimized independently of feed stock introduction and product removal rates so as to achieve thorough intermixing of the catalyst complex and the reactants and appropriate temperature control.

A product exit line 55 may preferably be provided in top head 12 at a point which is approximately adjacent the transition zone between the third and fourth passes. Such positioning may be desirable to avoid any potential for loss of unreacted isobutylene. Moreover, the positioning of the exit line 55 should be appropriate to facilitate bleeding of gas from the reactor during startup. A coolant may desirably be circulated on the shell side of the reactor at a rate to remove heat of reaction and maintain the desired temperature in the reactor.

The product exiting the system via line 55 should be quenched immediately with a material capable of killing the catalyst, such as, for example, ammonium hydroxide. Thus, any potential rearrangement of the polymer molecule which would shift the double bond away from the terminal position is minimized. The high vinylidene isobutylene product may then be directed to a work up system (not shown) where catalyst salts may be removed and the isobutylene product separated from unreacted isobutylene and other undesirable contaminants such as diluents, etc. These latter materials may then be recycled or diverted for other uses employing known methodology.

With the described recirculation system, the rate of feedstock introduction into the reaction mixture and the rate of product removal are each independent of the circulation rate. As will be appreciated by those of ordinary skill in the art, the number of passes through the reactor and the size and configuration of the latter are simply matters of choice. The feedstock and product withdrawal flow rates may preferably be chosen such that the residence time of the reaction mixture within the reactor is 4 minutes or less, desirably 3 minutes or less, preferably 2 minutes or less, even more preferably 1 minute or less, and ideally less than 1 minute. From a commercial operating viewpoint, the flow rate should be such that the residence time of the reaction mixture in the reactor is within the range of from about 45 to about 90 seconds. In connection with the foregoing, the residence time is defined as the total reactor system volume divided by the volumetric flow rate.

The recirculation flow rate, that is the flow rate of the reaction mixture in the system induced by the recirculation pump 25, is controlled, as described above, to achieve appropriate turbulence and/or heat transfer characteristics. This recirculation flow rate is often a function of the system itself and other desired process conditions. For the system described above, the ratio of the recirculation flow rate to the incoming feedstock flow rate (recycle ratio) should generally be maintained in the range of from about 20:1 to about 50:1, desirably in the range of from about 25:1 to about 40:1, and ideally in the range of from about 28:1 to about 35:1. In particular, in addition to causing turbulence and providing an appropriate heat transfer coefficient, the recirculation flow rate of the reaction mixture should be sufficient to keep the concentrations of the ingredients therein essentially constant and/or to minimize temperature gradients within the circulating reaction mixture whereby essentially isothermal conditions are established and maintained in the reactor.

As mentioned above, the recycle ratios generally may be in the range of from about 20:1 to about 50:1 when the desired product is highly reactive PIB. Higher recycle ratios increase the degree of mixing and the reactor approaches isothermal operation leading to narrower polymer distributions. Lower recycle ratios decrease the amount of mixing in the reactor, and as a result, there is a greater discrepancy in the temperature profiles. As the recycle ratio approaches zero, the design equations for the reactor reduce to those for a plug flow reactor model. On the other hand, as the recycle ratio approaches infinity, the modeling equations reduce to those for a CSTR. When CSTR conditions are achieved, both temperature and composition remain constant and the composition of the product stream leaving the reactor is identical to the composition of the reaction mixture recirculating in the reactor.

Needless to say, after steady state or near steady state operation has been established in the reactor, as the feedstock enters the system, an equal volume of product is pushed out of the reactor loop. Under CSTR conditions, the point at which the product stream is withdrawn is independent of reactor geometry. However, the top of the third pass was chosen for this particular embodiment of the invention so any air or non-condensable species in the reactor at start-up may conveniently be purged. Also, it is preferred that the withdrawal point be as far as possible from the point where fresh feedstock is introduced into the system just to make sure that conditions within the reactor have achieved steady state operation and are therefore as stable as possible.

When highly reactive PIB is the desired product, the feedstock entering the system through line 15 may be any isobutylene containing stream such as, but not limited to, isobutylene concentrate, dehydro effluent, or a typical raff-1 stream. These materials are described respectively below in Tables 1, 2 and 3.

TABLE 1

Isobutylene Concentrate

| Ingredient | Weight % |
|---|---|
| $C_3$ component | 0.00 |
| I-butane | 6.41 |
| n-butane | 1.68 |
| 1-butene | 1.30 |
| I-butene | 89.19 |
| trans-2-butene | 0.83 |
| cis-2-butene | 0.38 |
| 1,3-butadiene | 0.21 |

TABLE 2

Dehydro Effluent

| Ingredient | Weight % |
|---|---|
| $C_3$ components | 0.38 |
| I-butane | 43.07 |
| n-butane | 1.29 |
| 1-butene | 0.81 |
| I-butene | 52.58 |
| trans-2-butene | 0.98 |
| cis-2-butene | 0.69 |
| 1,3-butadiene | 0.20 |

TABLE 3

Raff-1

| Ingredient | Weight % |
|---|---|
| $C_3$ components | 0.57 |
| I-butane | 4.42 |
| n-butane | 16.15 |
| 1-butene | 37.22 |
| I-butene | 30.01 |
| trans-2-butene | 8.38 |
| cis-2-butene | 2.27 |
| 1,3-butadiene | 0.37 |
| MTBE | 0.61 |

For commercial and process economies, the isobutylene content of the feedstock generally should be at least about 30 weight %, with the remainder comprising one or more non-reactive hydrocarbon, preferably alkane, diluents.

The desired product is a relatively low molecular weight, highly reactive polyisobutylene. Thus, the polyisobutylene leaving the reactor by way of line 55 should have an average molecular weight which is less than about 10,000. Generally speaking, the produced isobutylene should have an average molecular weight within the range of from about 500 to about 5000, desirably from about 600 to about 4000, preferably from about 700 to about 3000, even more preferably from about 800 to about 2000, and ideally from about 950 to about 1050. By carefully controlling the various parameters of the process, it might even be possible to produce a product wherein the average molecular weight is consistent at some desired number, for example, 1000.

The polydispersity of the PIB may also be important. The term polydispersity refers to the molecular weight distribution in a given polymer product and generally is defined as the ratio of the molecular weight of the highest molecular weight molecule to the molecular weight of the lowest molecular weight molecule. Polydispersity may be controlled by carefully maintaining constant monomer concentrations and isothermal conditions within the reaction mixture. Generally speaking, it is desirable that the polydispersity be as low as possible in order to diminish the content of unwanted relatively low or high molecular weight polyisobutylenes in the product and thus improve the quality of the latter. By following the concepts and principles of the present invention, it has been found that the polydispersity of the product maybe controlled at no more than about 2.0. Preferably, through the use of the invention, a polydispersity of no more than about 1.65 may be achieved. Even more desirably, the polydispersity may be controlled so as to be within the range of from about 1.3 to about 1.5.

The polyisobutylene product obtained through the use of the present invention should generally have a terminal (vinylidene) unsaturation content of at least about 70%. That is to say, at least about 70% of the double bonds remaining in the polymerized product should preferably be in a terminal position. Ideally the vinylidene content should be no less than about 80% or even higher. However, vinylidene content is indirectly related to conversion rates. That is to say, the higher the conversion rate, the lower the vinylidene content. Moreover, vinylidene content is directly related in the same way to molecular weight. Accordingly, in each process a balance is required between molecular weight, conversion rate and vinylidene content.

EXAMPLE 1

Using the principles and concepts of the invention, a reactor such as the reactor illustrated in FIG. 1, was used to produce a low molecular weight, highly reactive polyisobutylene. The feedstock was essentially the same as shown above in Table 1, and the coolant circulated on the shell side of the reactor was a mixture of 35 weight % methanol and 65 weight % water. The inlet coolant temperature was 32° F. A 1:1 $BF_3$/methanol complex catalyst was used. All pertinent reactor data and dimensions are set forth below in Table 4.

TABLE 4

| | |
|---|---|
| Feedstock flow rate | 1.7 gpm |
| Recirculation flow rate | 50 gpm |
| Feedstock density | 5 lb/gal |
| Conversion | 63 wt % |
| Concentration of isobutylene in feedstock | 92 wt % |
| $\Delta H_{reaction}$ | 398 Btu/lb |
| $\mu$ reaction mixture | 4.5 cP = 0.0030 lb/ft sec |
| Cp of reaction mixture | 0.46 Btu/lb ° F. |
| Reaction effective density | 44.9 lb/ft$^3$ |
| Thermal conductivity | 0.075 Btu/hr ft ° F. |
| Total volume of reactor recirculation system | 390.2 in$^3$ |
| Residence time | 59.6 seconds |
| Linear velocity inside tubes | 9.3 ft/sec |
| Reynolds number | 3180 |
| Surface area of tubes | 23.6 ft$^2$ |
| Heat generated | 1961 Btu/min |
| $\Delta T_{lm}$ | 37.3° F. |
| Heat flux | 83.2 Btu/min ft$^2$ |
| U | 133.7 Btu/min ft$^2$ ° F. |
| Cp of coolant | 0.86 Btu/lb ° F. |
| Density of coolant | 7.70 lb/gal |
| Coolant flow rate | 39.3 gpm |
| $\Delta T$ coolant | 8.0° F. |
| Heat removed | 2074 Btu/min |

The composition of the product thus obtained is as set forth below in Table 5.

TABLE 5

Crude Polyisobutylene Product

| Ingredient | Weight % |
|---|---|
| C$_3$ components | 0.00 |
| I-butane | 6.41 |
| n-butane | 1.68 |
| 1-butene | 1.30 |
| I-butene | 33.00 |
| trans-2-butene | 0.83 |
| cis-2-butene | 0.38 |
| 1,3-butadiene | 0.21 |
| polyisobutylene | 56.19 |

Again it is to be noted that one of the main objectives in accordance with the invention is to provide a flow rate through the reactor and other parameters such that the reaction mixture is in a generally constant state of turbulent flow during the reaction. Turbulent flow results in a twofold augmentation of the overall process. First, turbulent flow results in intimate intermixing of the contents of the reactor to enhance the kinetics of the reaction. Second, turbulent flow results in an enhancement of the tube side heat transfer coefficient to thereby improve the removal of the heat of the reaction. These results may be achieved by conducting the reaction on the tube side of a shell-and-tube heat exchanger reactor and circulating a coolant on the shell side.

The foregoing description concerns methodology which permits the PIB polymerization reaction to be conducted at higher temperatures and at lower residence times than current processes. In accordance with this embodiment of the present invention, a stable $BF_3$ catalyst system ($BF_3$/methanol) may be used. Moreover, an improved turbulent loop reactor configuration including a heat exchanger to effect simultaneous heat removal is advantageously employed. The turbulent flow also enables intimate mixing of the two-phase reaction system.

In addition to highly reactive PIB, the process of the invention provides an improved process for preparing oligomers and higher molecular weight polymers from olefinic precursors. In general, the process of the invention may be used to produce conventional PIB, low molecular weight oligomers of branched olefins, preferably isobutylene, oligomers and higher molecular weight polymers of linear $C_3$–$C_{15}$ alpha olefins, and oligomers and higher molecular weight polymers of $C_4$–$C_{15}$ reactive non-alpha olefins. In accordance with this aspect of the invention, and particularly where the desired product is a relatively low molecular weight (<350 and perhaps even <250) oligomer, the catalyst complex is desirably stable, even under the relatively higher reaction temperatures needed for the production of oligomeric olefinic products.

Figure 2:
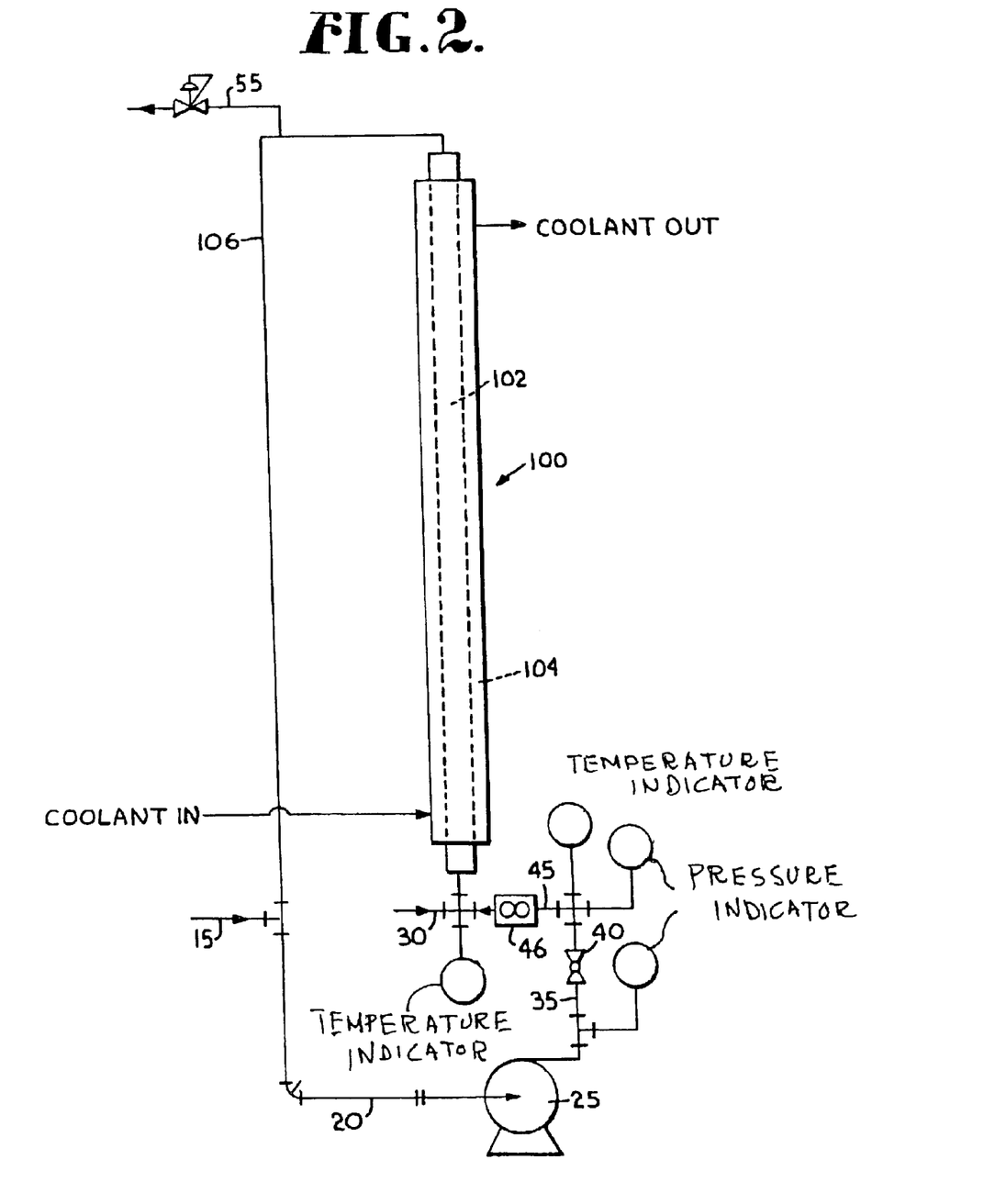
FIG. 2 is a schematic illustration of an alternative reactor in the form of a single pass shell and tube exchanger which is also useful for carrying out the improved process of the invention.

Examples of processes for production of relatively low molecular weight oligomers of olefinic monomeric components are set forth below. In these examples, a loop reactor as illustrated in FIG. 2 is utilized advantageously. As illustrated in FIG. 2, the reactor 100 may consist of a single tube 102 surrounded by a heat exchanger shell 104. In all other essential aspects, the recirculation system may preferably be the same as described in connection with the reactor 10 of FIG. 1, except that a recirculation line 106 is provided to return the recirculating residual mixture from the top of reactor tube 102 to the pump suction line 20. The exit line 55 is connected directly to recirculation line 106 as shown.

EXAMPLE 2

A stream containing 2.19 wt % Isobutane, 61.5 wt % n-butane, 0.64 wt % 1-butene, 28.18 wt % trans-2-butene and 7.49 wt % cis-2-butene (35.66 wt % 2-butene) is introduced into the a loop reactor system of FIG. 2 via feed line 15 at a rate of 156 ml/min (93.6 g/min). A catalyst complex containing BF3/methanol complex (one mole of BF3 to one mole of methanol) is fed to the reactor at a rate of 8 ml/min (10.4 g/min). The reaction temperature is maintained constant at 90° F. All pertinent reactor data and dimensions are set forth below in Table 6. The reactor effluent exits the top of the reaction loop via line 55 and is fed into a decant (not shown) were the catalyst is preferably separated out from the organic layer. A portion of the catalyst may then be recycled back to the reactor lowering the amount of fresh catalyst required. The product coming out of the decant overhead is mixed with $NH_4OH$ to quench any remaining catalyst in the organic phase and is sent to a second decant. The products is washed twice more with water and decanted to remove the last traces of catalyst. The oligomer product composition is given in Table 7.

TABLE 6

| | |
|---|---|
| HC flow rate | 0.0412 gpm |
| Pump around flow rate | 1.5 gpm |
| HC density | 5 lb/gal |
| % Conversion | 51 wt % |
| % 2-butene in feed stock | 36.55 wt % |
| $\Delta H_{rxn}$ | 318 Btu/lb |
| $\mu$ | 0.6 cP = 0.0004 lb/ft-s |
| Cp | 0.46 Btu/lb- ° F. |
| Reactor OD | 0.375 in |
| Reactor wall thickness | 0.035 in |
| Reactor ID | 0.305 in |
| Reactor length | 10.5 ft |
| Reactor volume | 9.2 in$^3$ |
| # of tubes | 1 |
| # of passes | 1 |
| Residence time | 58.02 seconds |
| Linear velocity | 6.59 ft/s |
| Surface area | 1.03 ft$^2$ |
| Heat generated | 12.2 Btu/min |
| $\Delta T_{lm}$ | 3.0° F. |
| Heat flux | 11.8 Btu/min-ft$^2$ |
| U | 237.0 Btu/hr-ft$^2$- ° F. |
| Re | 15531 |

TABLE 7

| | |
|---|---|
| $C_8$ | 7.9 wt % |
| $C_{12}$ | 29.8 wt % |
| $C_{16}$ | 35.9 wt % |
| $C_{20}$ | 16.1 wt % |
| $C_{20+}$ | 10.3 wt % |

EXAMPLE 3

A stream containing 94.0 wt % 1-decene and 6.0 wt % $C_{10}$-isomers was fed into the loop reactor of FIG. 2 at a rate of 10 ml/min (7.4 g/min). A catalyst complex containing BF3/methanol complex (one mole of BF3 to one mole of methanol) was fed to the reactor at a rate of 1 ml/min (1.3 g/min). The reaction was held at a constant temperature of 70° F. All pertinent reactor data and dimensions are given in Table 8. Both the reactor setup and downstream catalyst removal steps are identical to Example 2. The product stream contained about 59.8 wt % of $C_{20}$ oligomers and about 40.2 wt % of $C_{30}$ oligomers.

TABLE 8

| | |
|---|---|
| HC flow rate | 0.00264 gpm |
| Pump around flow rate | 1.5 gpm |
| HC density | 6.2 lb/gal |
| % Conversion | 90 wt % |
| % 1-decene in feed stock | 94 wt % |
| $\Delta H_{rxn}$ | 318 Btu/lb |
| $\mu$ | 1.2 cP = 0.0008 lb/ft s |
| Cp | 0.50 Btu/lb ° F. |
| Reactor OD | 0.375 in |
| Reactor wall thickness | 0.035 in |
| Reactor ID | 0.305 in |
| Reactor length | 10.5 ft |
| Reactor volume | 9.2 in$^3$ |
| # of tubes | 1 |
| # of passes | 1 |
| Residence time | 905.13 seconds |
| Linear velocity | 6.59 ft/s |
| Surface area | 1.03 ft$^2$ |

TABLE 8-continued

| | |
|---|---|
| Heat generated | 4.4 Btu/min |
| $\Delta T_{lm}$ | 1.2° F. |
| Heat flux | 4.3 Btu/min-ft$^2$ |
| U | 213.2 Btu/hr-ft$^2$- ° F. |
| Re | 9604.4 |

As can be seen from the foregoing examples, the invention provides a process for preparing a polyolefin product having preselected properties. In accordance with the invention, the process advantageously employs a stable complex of $BF_3$ and a complexing agent therefor. The residual reaction mixture in the reaction zone is recirculated at a recirculation rate sufficient to cause intimate intermixing of the reaction mixture. The rate is also such that the heat of reaction is removed from the reaction mixture at a rate calculated to provide a substantially constant reaction temperature in the reaction mixture while the same is recirculating in the reaction zone. The introduction of the feedstock and the withdrawal of the product stream are controlling such that the residence time of the olefinic components undergoing polymerization in the reaction zone is appropriate for production of the desired polyolefin product.

Although the foregoing text and examples have focused on processes wherein a single monomer is included in the feedstock, it will be apparent to the routineers in the olefin polymerization art that in accordance with the principles and concepts of the present invention, the feedstock may desirably, at times, include two or more monomers so as to produce useful copolymeric products.

We claim:

1. A single-stage liquid phase polymerization process for preparing a polyolefin product having preselected properties, said process comprising:

providing a liquid feedstock comprising at least one olefinic component;

providing a catalyst composition comprising a complex of $BF_3$ and a complexing agent therefor, said complexing agent comprising a glycol or an aliphatic alcohol having a primary hydroxyl group and no hydrogen on a beta carbon, said complex being stable at temperatures needed to produce said polyolefin product;

introducing said feedstock and said catalyst composition into a residual reaction mixture in a loop reactor reaction zone, said reaction zone comprising a tube side of a shell-and-tube heat exchanger;

recirculating the residual reaction mixture with the feedstock and the catalyst composition therein in said zone at a recirculation rate sufficient to establish a Reynolds number of at least about 2000 in the zone and thereby cause intimate intermixing of the residual reaction mixture, the feedstock and the catalyst composition to thereby present a recirculating, intimately intermixed reaction admixture of the residual reaction mixture, the feedstock and the catalyst composition in said reaction zone;

maintaining the recirculating intimately intermixed reaction admixture in its intimately intermixed condition and removing heat of reaction from the reaction admixture at a rate calculated to provide a substantially constant reaction temperature in the reaction admixture while the same is recirculating in said reaction zone, said constant reaction temperature being at a level appropriate for causing olefinic components introduced in said feedstock to undergo polymerization to form said polyolefin product in the presence of said catalyst composition;

withdrawing a product stream comprising polyolefin product and catalyst composition from said reaction zone;
adding a quenching material capable of killing the catalyst to the withdrawn product stream; and
controlling the introduction of said feedstock into said reaction zone and the withdrawal of said product stream from the reaction zone such that the residence time of the olefinic components undergoing polymerization in the reaction zone is appropriate for production of said polyolefin product.

2. A process as set forth in claim 1, wherein said heat of reaction is removed simultaneously with its generation by circulation of a coolant in the shell side of the exchanger.

3. A process as set forth in claim 1, wherein said residence time is no greater than 4 minutes.

4. A process as set forth in claim 1, wherein said residence time is no greater than 3 minutes.

5. A process as set forth in claim 1, wherein said residence time is no greater than 2 minutes.

6. A process as set forth in claim 1, wherein said residence time is no greater than 1 minute.

7. A process as set forth in claim 1, where said complexing agent comprises an alcohol.

8. A process as set forth in claim 7, where said complexing agent comprises a $C_1$–$C_8$ alcohol.

9. A process as set forth in claim 7, where said alcohol comprises methanol.

10. A process as set forth in claim 7, where said alcohol comprises neopentanol.

11. A process as set forth in claim 1, where said complexing agent comprises a glycol.

12. A process as set forth in claim 11, where said complexing agent comprises ethylene glycol.

13. A process as set forth in claim 1, wherein the molar ratio of $BF_3$ to complexing agent in said complex ranges from approximately 0.5:1 to approximately 5:1.

14. A process as set forth in claim 1, wherein the molar ratio of $BF_3$ to complexing agent in said complex ranges from approximately 0.5:1 to approximately 2:1.

15. A process as set forth in claim 1, wherein the molar ratio of $BF_3$ to complexing agent in said complex ranges from approximately 0.5:1 to approximately 1:1.

16. A process as set forth in claim 1, wherein the molar ratio of $BF_3$ to complexing agent in said complex is approximately 1:1.

17. A process as set forth in claim 1, wherein the molar ratio of $BF_3$ to complexing agent in said complex is approximately 0.75:1.

18. A process as set forth in claim 1, wherein from about 0.1 to about 10 millimoles of $BF_3$ are introduced into said reaction admixture with said catalyst composition for each mole of olefinic component introduced into said admixture in said feedstock.

19. A process as set forth in claim 1, wherein from about 0.5 to about 2 millimoles of $BF_3$ are introduced into said reaction admixture with said catalyst composition for each mole of olefinic component introduced into said admixture in said feedstock.

20. A process as set forth in claim 1, wherein the reaction admixture is recirculated at a first volumetric flow rate, and said feedstock and said catalyst composition are introduced at a combined second volumetric flow rate.

21. A process as set forth in claim 20, wherein the ratio of said first volumetric flow rate to said second volumetric flow rate is such that the concentrations of ingredients in the reaction admixture remain essentially constant.

22. A process as set forth in claim 20, wherein the ratio of said first volumetric flow rate to said second volumetric flow rate is such that essentially isothermal conditions are established and maintained in said reaction admixture.

23. A process as set forth in claim 20, wherein said feedstock and said catalyst composition are premixed and introduced into the reaction zone together as a single stream at said second volumetric flow rate.

24. A process as set forth in claim 20, wherein said feedstock and said catalyst composition are introduced into the reaction zone separately as two streams, the flow rates of which together add up to said second volumetric flow rate.

25. A process as set forth in claim 20, wherein turbulent flow is maintained in said reaction zone.

26. A process as set forth in claim 25, wherein a heat transfer coefficient U of at least about 50 Btu/min ft$^2$°F. is maintained in said reaction zone.

27. A process as set forth in claim 1, wherein said feed stock comprises at least 30% by weight of said olefinic component.

28. A process as set forth in claim 1, wherein said feed stock comprises a non-reactive hydrocarbon diluent.

29. A process as set forth in claim 28, wherein said feed stock comprises at least 30% by weight of said olefinic component.

30. A process as set forth in claim 1, wherein said polyolefin product has a molecular weight of no more than 5000.

31. A process as set forth in claim 30, wherein said polyolefin product has a molecular weight of at least about 350.

32. A process as set forth in claim 31, wherein the olefinic component comprises isobutylene and the polyolefin product comprises polyisobutylene.

33. A process as set forth in claim 32, wherein said polyisobutylene has a vinylidene content of at least 50%.

34. A process as set forth in claim 32, wherein said liquid feedstock comprises a raff-1 stream.

35. A process as set forth in claim 32, wherein said feed stock comprises an isobutylene concentrate.

36. A process as set forth in claim 32, wherein said feed stock comprises a dehydro effluent.

37. A process as set forth in claim 30, wherein said polyolefin product has a molecular weight of at least 250.

38. A process as set forth in claim 1, wherein said liquid feedstock comprises a raff-1 stream.

39. A process as set forth in claim 1, wherein said feed stock comprises an isobutylene concentrate.

40. A process as set forth in claim 1 wherein said feed stock comprises a dehydro effluent.

41. A process as set forth in claim 20, wherein the ratio of said first volumetric flow rate to said second volumetric flow rate ranges from about 20:1 to about 50:1.

42. A process as set forth in claim 41, wherein the ratio of said first volumetric flow rate to said second volumetric flow rate ranges from about 25:1 to about 40:1.

43. A process as set forth in claim 42, wherein the ratio of said first volumetric flow rate to said second volumetric flow rate ranges from about 28:1 to about 35:1.

44. A process as set forth in claim 41, wherein said feed stock comprises at least 30% by weight of said olefinic component.

45. A process as set forth in claim 41, wherein said feed stock comprises an isobutylene concentrate.

46. A process as set forth in claim 41 wherein said feed stock comprises a dehydro effluent.

47. A process as set forth in claim 41 wherein said feed stock comprises a raff-1 stream.

48. A process as set forth in claim 7, wherein the olefinic component comprises a $C_3$ to $C_{15}$ linear alpha olefin.

49. A process as set forth in claim 7, wherein the olefinic component comprises a $C_4$ to $C_{15}$ non-alpha olefin.

50. A process as set forth in claim 49 wherein the olefinic component is 2-butene.

51. A process as set forth in claim 11, wherein the olefinic component comprises a $C_3$ to $C_{15}$ linear alpha olefin.

52. A process as set forth in claim 11, wherein the olefinic component comprises a $C_4$ to $C_{15}$ non-alpha olefin.

53. A process as set forth in claim 52, wherein the olefinic component is 2-butene.

\* \* \* \* \*